United States Patent
Cheng et al.

(10) Patent No.: US 6,727,667 B2
(45) Date of Patent: Apr. 27, 2004

(54) MULTIPLE CONTROL DEVICE FOR LINEAR ACTUATOR

(75) Inventors: Chi-Yuan Cheng, Taichung (TW); Kuei-Ju Kuo, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 10/216,640
(22) Filed: Aug. 12, 2002
(65) Prior Publication Data
  US 2004/0051486 A1 Mar. 18, 2004
(30) Foreign Application Priority Data
  Sep. 3, 2001 (TW) ........................................ 90215056 U
(51) Int. Cl.[7] .............................................. H02K 41/00
(52) U.S. Cl. ..................... 318/135; 200/5 B; 200/50.32
(58) Field of Search ...................... 310/12–14; 318/119, 318/120, 122, 134, 126–128, 135; 200/50.32, 57, 1 R, 16 A, 334, 5 A–5 F

(56) References Cited

U.S. PATENT DOCUMENTS 5,994,652 A  * 11/1999  Umemura ..................... 200/5 B
6,404,089 B1 *  6/2002  Tomion ......................... 310/162

* cited by examiner

Primary Examiner—Burton S. Mullins
Assistant Examiner—Judson H. Jones
(74) Attorney, Agent, or Firm—Charles E. Baxley

(57) ABSTRACT

A linear actuator includes a casing and a retractable member driven by a motor is movably received in the casing and a contact member is connected to the retractable member. A first position switch connected to the motor, a plurality of travel switches and a final position switch connected with a diode are connected to the actuator. These switches are connected in series by normal-close switches. Normal-open switches of the travel switches located between the first position switch and the final position switch are connected to a circuit of the control device. The motor is stopped when the final position switch touches the contact member of the retractable member, the motor is activated, when a current is applied to the diode again.

2 Claims, 3 Drawing Sheets

MULTIPLE CONTROL DEVICE FOR LINEAR ACTUATOR

FIELD OF THE INVENTION

The present invention relates to a multiple control device for a linear actuator, and more particularly, to a control device that control the retractable member to be positioned at different positions by activating and stopping the DC motor.

BACKGROUND OF THE INVENTION

A conventional linear actuator is shown in FIG. 1 and generally includes control device 10 which is connected with four limit switches 131, 132, 133 and 134 which are installed on the convention linear actuator 12. A retractable member 121 is retractably received in the actuator 12 and driven by a direct current (DC) motor 11. When the retractable member 121 is located in the deepest position as shown in FIG. 1, the electric power for the motor 11 is cut by the control device 10. When the motor 11 is activated by a signal sent from the control device 10, the retractable member 121 extends and the contact member 122 on the retractable member 121 removes from the first switch 131 and touches the second switch 132 which then sends a signal to the control device 10 to stop the motor 11 such that the retractable member 121 is set at the desired position. The same processes may proceed to let the retractable member 121 extend from the second switch 132 to the third switch 133 and the fourth switch 134. When the retractable member 121 is retracted from the position where the contact member 122 is engaged with the fourth switch 134, the control device 10 sends a reverse signal to the motor 11 which pulls the retractable member 121 backward and the retractable member 121 is stopped when the contact member 122 touches the third switch 133. By the process, the retractable member 121 can be retracted back to the original position. However, this requires a plurality of wires connected between the control device 10, the switches 131 to 134, and the motor 11. The wire connection could be a huge problem for multiple number of actuators in a building.

The present invention intends to provide a control device that includes a circuit which makes the connection between the actuator, the switches and the motor be simplified.

SUMMARY OF THE INVENTION

In accordance with one aspect of the present invention, there is provided a linear actuator which includes a casing and a retractable member driven by a motor is movably received in the casing and a contact member is connected to the retractable member. A first position switch connected to the motor, a plurality of travel switches and a final position switch are connected to the actuator. These switches are connected in series by normal-close switches. Normal-open switches of the travel switches located between the first position switch and the final position switch are connected to a circuit of the control device.

The primary object of the present invention is to provide a control device for a linear actuator wherein the circuit of the control device simplifies the wire connection between the position switches.

Another object of the present invention is to provide a control device wherein the position switches are connected in series so that the connection of the circuit is simplified even if the number of the position switches increases.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
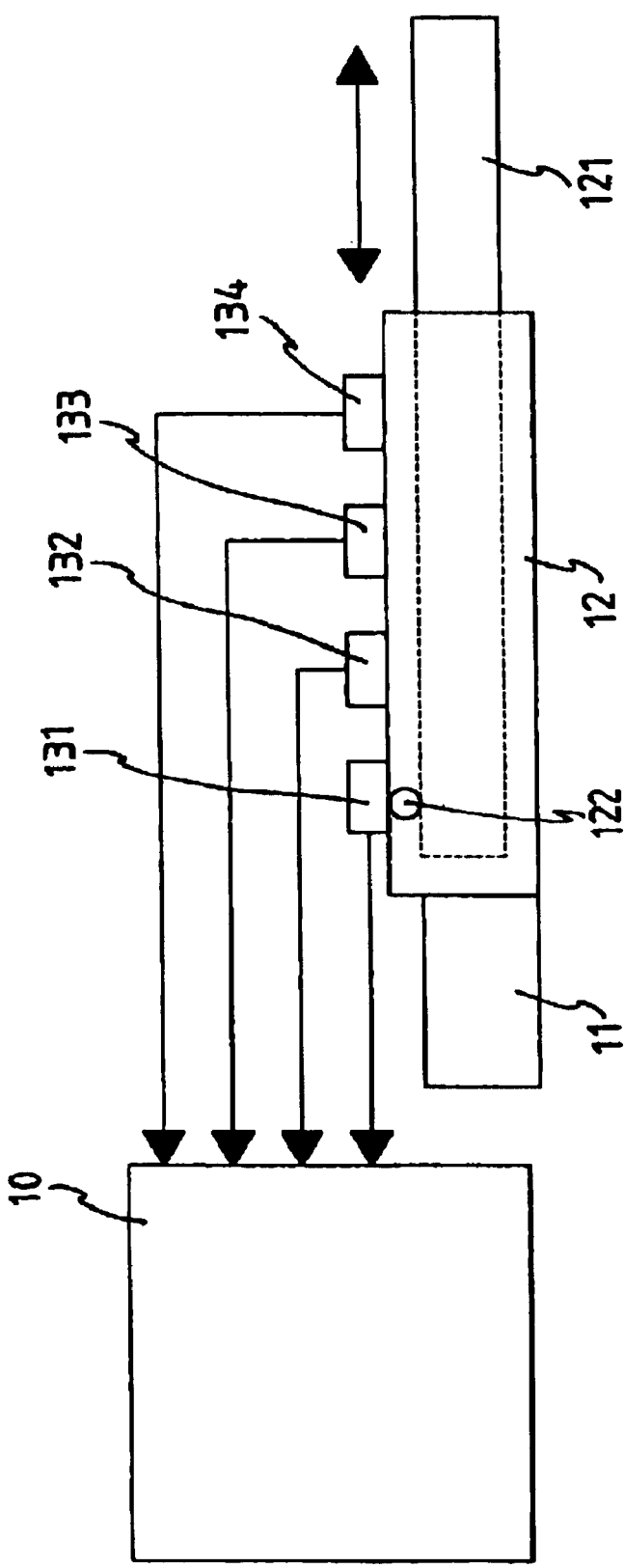
FIG. 1 shows the conventional linear actuator and the conventional control device.
Figure 2:
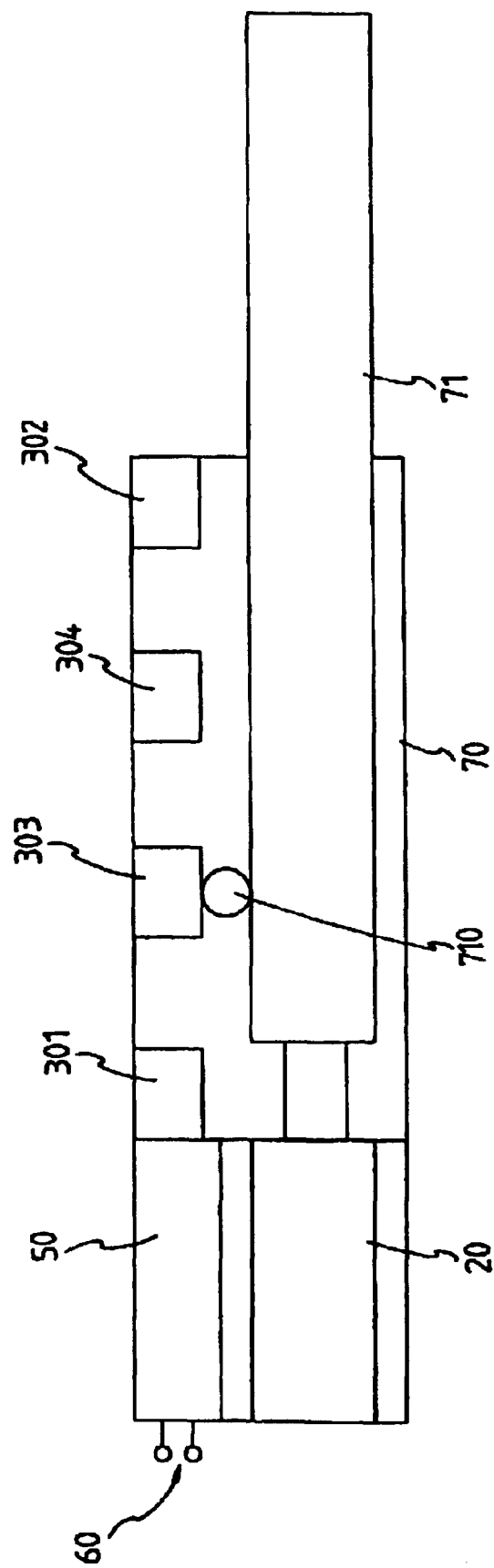
FIG. 2 shows the linear actuator of the present invention.
Figure 3:
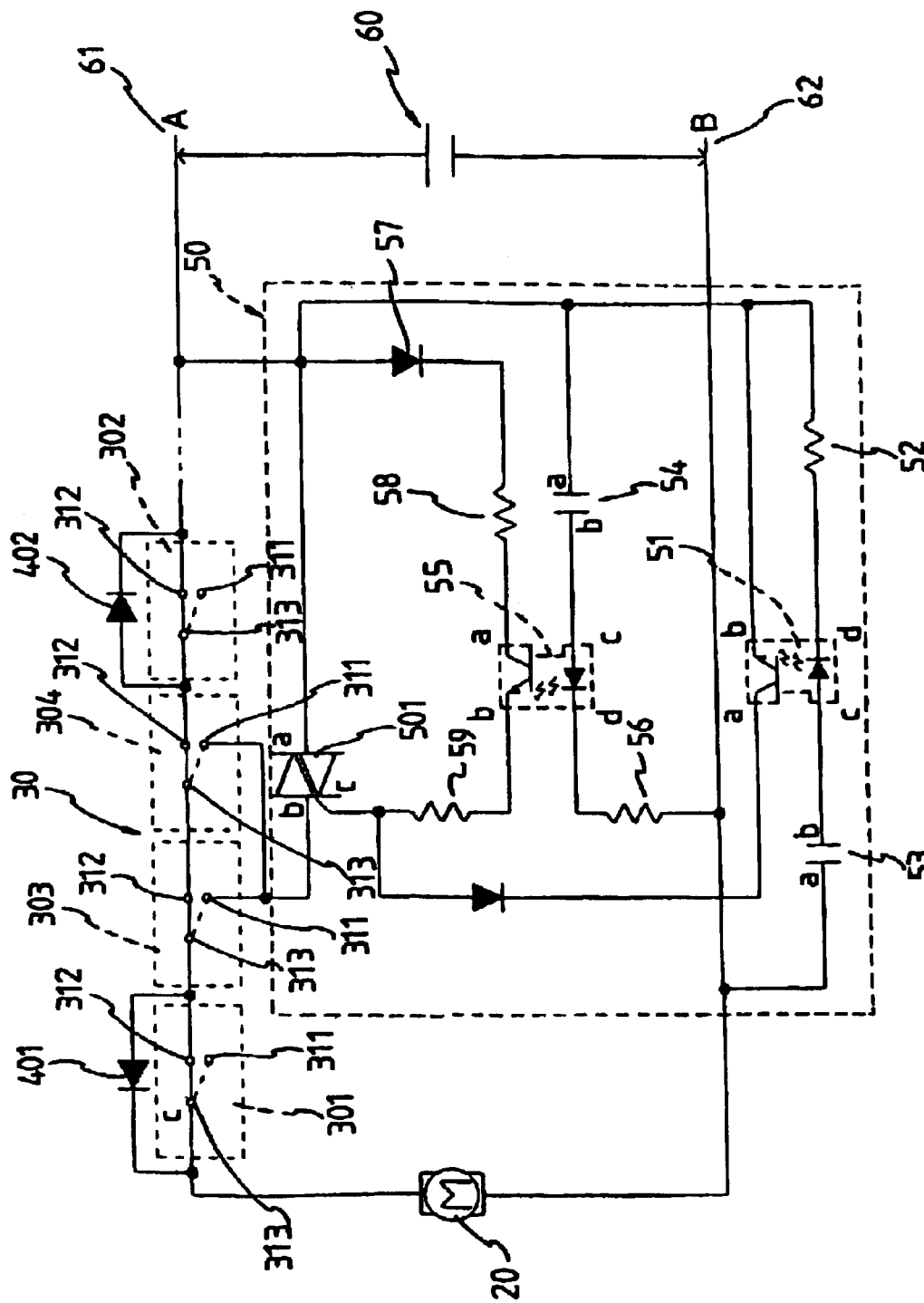
FIG. 3 shows the circuit of the control device of the present invention.

Referring to FIGS. 2 and 3, the linear actuator of the present invention comprises a casing 70 and a retractable member 71 which is movably received in the casing 70 and driven by a motor 20. A contact member 710 is connected to the retractable member 71 so as to contact the position switches connected to the casing 70 of the actuator.

The position switches 30 includes a first position switch 301, two travel switches 303, 304 and a final position switch 302. The first position switch 301 is located close to the motor 20 and located at a beginning point of a travel path of the retractable member 71. The first position switch 301 is connected with a diode 401 and electrically connected to the motor 20. The final position switch 302 is connected with a diode 402 and located at a final point of the travel path of the retractable member 71.

The position switches 30 includes normal-open, normal-close and common connection points 311, 312, 313 and the position switches 30 are connected with each other in series by the normal-close switches 312 according to the sequences of the travel of the retractable member 71. The first position switch 301 and the final position switch 302 are connected to the power supply 60 and the motor 20 respectively so that the power supply 60, the position switches 30 and the motor 20 are connected as a circuit. The normal-open switches 311 of the travel switches 303, 304 are connected to the control circuit 50. The motor 20 stops when the retractable member 71 touches either the first position switch 301 or the final position switch 302. The motor 20 is activated in reverse by applying a reverse voltage to the diodes 401 or 402. When the retractable member 71 touches the travel switch 303 or 304, the motor 20 stops and the motor 20 re-starts again when a reverse voltage is applied via the control circuit 50.

The control circuit 50 includes a Thyristor and two rechargeable Photocouple circuit loop. The Thyristor can be a TRIACs and is connected to the normal-open switches of the travel switches 303, 304 such that when the retractable member 71 touches the travel switches 303, 304, the Thyristor provides a temporary electric path to let the actuator move when the actuator is powered again.

When a positive signal (+) is sent to the input A (61) of the power supply 60 and a negative signal (−) is sent to the input B (62) of the power supply 60, the power supply 60, the position switches 30 and the motor 20 establish a circuit so as to drive the actuator.

When the retractable member 71 is retracted to contact the first position switch 301, the common connection point 313 and the normal-close switch 312 of the final switch 301 are separated, and the common connection point 313 is connected to the normal-open switch 311. The power supply 60 is cut and the motor 20 is quiet. If a negative signal (−) is input to the input A(61) and a positive signal (+) is input to the input B(62), an open circuit is resulted because of the input B(62), the motor 20 and the diode 401 which has a reverse function. The retractable member 71 is stopped at the position where the contact member 710 touches the first position switch 301.

When the retractable member 71 is to be moved from the first position switch 301 to the first travel switch 303, a positive signal (+) is input to the input A(61) and a negative signal (−) is input to the input B(62). Because the leg d of the Photocouple 51 is connected to the input A(61) of the power supply 60 via the resistor 52, and the leg c of the Photocouple 51 is connected to the input B(62) of the power supply 60 via the capacitor 53 to perform a reverse feature, the circuit is cut. On the other hand, a circuit is formed wherein the input A(61) is connected to the Photocouple 55 via the capacitor 54, to the input B(62) via the legs c and d and the resistor 56. Due to the direct current for the capacitor 54 and the input power supply 60, the capacitor 54 is charged in a short period of time. The leg a of the capacitor 54 has the same value of voltage of the input A(61), and the leg b of the capacitor 54 has the same value of voltage of the input B(62). The Photocouple 55 is not activated and an open circuit is formed between the legs a and b. However, the positive signal (+) from the input A(61) goes through the normal-close switch and the common connection point 312, 313 of the final position switch 302, the normal-close switch and the common connection point 312, 313 of the travel switch 303, the diode 401, the motor 20 and back to the input B(62) to form a circuit so as to activate the motor 20 such that the retractable member 71 moves toward the travel switch 303.

When the retractable member 71 touches the travel switch 303, the common connection points and the normal-close switch 313, 312 open and the common connection points and the normal-open switch 313, 311 are closed to open the previous circuit so that the motor 20 is stopped. The retractable member 71 stops at the first position switch 303.

When the retractable member 71 is to be moved again to the travel switch 304, the signal to the two input A(61) and B(62) of the power supply 60 is removed, and the capacitor 54 discharges because the leg a is positive and the leg b is negative. After discharged, make the input A(61) to be positive and the input B(62) to be negative, this makes a sudden short between the leg a and leg b such that a circuit is formed by the input A(61), capacitor 54, the legs c and d of the Photocouple 55, resistor 56 to the input B(62). The circuit makes the leg a and b of the Photocouple 55 to be closed and a circuit is formed by the input A(61), diode 57, resistor 58, the legs a and b of the Photocouple 55, resistor 59, the legs c and b of the TRIACs, the normal-open switch and the common connection point 311, 313 of the travel switches 303, 304, the normal-close switch and the common connection point 312, 313 of the final switches 301, 302, the motor 20 and the input B(62). This makes the legs a and b of the TRIACs 501 to be connected.

The main circuit works from input A(61), the leg a and b of the TRIACs 501, the normal-open switch and the common connection point 311, 313 of the travel switches 303, the normal-close switch and the common connection point 312, 313 of the final switches 301, the motor 20 and the input B(62). This makes the motor 20 work and the retractable member 71 moves toward the travel switch 304. When the retractable member 71 disengages from the travel switch 303, the normal-close switch and the common connection point 313, 312 of the travel switches 303 are opened. The normal-open switch and the common connection point 311, 313 are opened and the legs a and b of the TRIACs 501 are closed. The main circuit works by the normal-close switch and the common connection point 311, 313 of the travel switch 303 to activate the motor 20 to move the retractable member 71 toward the travel switch 304.

When the retractable member 71 touches the travel switch 304 whose the normal-close switch and the common connection point 311, 313 are opened, and the normal-open switch and the common connection point 311, 313 are short. The previous circuit is opened and the motor 20 stops such that the retractable member 71 is set at the second travel switch 304.

When the retractable member 71 is to be moved again to the final switch 302, the signal to the two inputs A(61) and B(62) of the power supply 60 is removed, and the capacitor 54 discharges because the leg a is positive and the leg b is negative. After discharged, make the input A(61) to be positive and the input B(62) to be negative, this makes a sudden short between the leg a and leg b of the capacitor 54 such that a circuit is formed by the input A(61), capacitor 54, the legs c and d of the Photocouple 55, resistor 56 to the input B(62). The circuit makes the legs a and b of the Photocouple 55 to be closed and a circuit is formed by the input A(61), diode 57, resistor 58, the legs a and b of the Photocouple 55, resistor 59, the legs c and b of the TRIACs 501, the normal-open switch and the common connection point 311, 313 of the travel switch 304, the normal-close switch and the common connection point 312, 313 of the travel switch 303, the normal-close switch and the common connection point 312, 313 of the final switch 301, the motor 20 and the input B(62). This makes the legs a and b of the TRIACs 501 to be connected.

The main circuit works from input A(61) with a positive signal, the legs a and b of the TRIACs 501, the normal-open switch and the common connection point 311, 313 of the travel switches 304, the normal-close switch and the common connection point 312, 313 of the travel switch 303, the normal-close switch and the common connection point 312, 313 of the final switch 301, the motor 20 and the input B(62) with the negative signal. This makes the motor 20 work and the retractable member 71 moves toward the final switch 302. When the retractable member 71 disengages from the travel switch 304, the normal-close switch and the common connection point 313, 312 of the travel switches 304 are short. The normal-open switch and the common connection point 311, 313 are opened and the legs a and b of the TRIACs 501 are opened. The main circuit works by the normal-close switch and the common connection point 312, 313 of the travel switch 304 to activate the motor 20 to move the retractable member 71 toward the final switch 302.

When the retractable member 71 touches the final switch 302 whose the normal-open switch and the common connection point 311, 313 are short, and the normal-close switch and the common connection point 312, 313 are open. The circuit between the input A(61) and the diode 402 is opened and the motor 20 stops such that the retractable member 71 is set at the final position.

When the retractable member 71 is to be moved in reverse from the final position switch 302 to the second travel switch 304, a positive signal is input to the input B(62) and a negative signal is input to the input (61). Because the leg d of the Photocouple 55 is connected to the input B(62) of the power supply 60 via the resistor 56, and the leg c of the Photocouple 55 is connected to the input A(61) of the power supply 60 via the capacitor 54 to perform a reverse feature, the circuit is cut. On the other hand, a circuit is formed wherein the input B(62) is connected to the legs c and d of the Photocouple 51 and the resistor 52 via the capacitor 53, to the input A(61). Due to the direct current for the capacitor 53 and the input power supply 60, the capacitor 53 is charged in a short period of time. The leg a of the capacitor 53 has the same value of voltage of the input B(62), and the leg b of the capacitor 53 has the same value of voltage of the input A(61). The Photocouple 51 is not activated and an open circuit is formed between the legs a and b. Therefore, the two legs a and b of the TRIACs 501 are cut. The positive signal from the input B(62) goes through the motor 20, the normal-close switch and the common connection point 312, 313 of the final position switch 301, the normal-close switch and the common connection point 312, 313 of the travel switch 303, the normal-close switch and the common connection point 312, 313 of the travel switch 304, the diode 402, and back to the input A(61) (negative signal) to form a circuit so as to activate the motor 20 in verse such that the retractable member 71 moves toward the travel switch 304.

The structure of the control circuit is concise and the volume is compact so that it can be installed in the actuator. The number of the positions that the retractable member 71 is to be positioned can be increased by adding the travel switches connected in series.

While we have shown and described the embodiment in accordance with the present invention, it should be clear to those skilled in the art that further embodiments may be made without departing from the scope of the present invention.

What is claimed is:

1. A combination of a control and a linear actuator, the actuator including a casing and a retractable member received in the casing, a contact member connected to the retractable member; a motor, the motor driving the retractable member retractably received in the casing of the linear actuator, a first position switch, a plurality of travel switches and a final position switch connected to monitor and control the position of retractable member, the first position switch, the travel switches and the final position switch being connected in series by normal-close contacts of these switches, the first position switch connected to the motor and located at a beginning point of a travel path of the retractable member, first position switch and the final position switch connected to the normal-close contacts of two diodes respectively, and the final position switch located at a final point of the travel path of the retractable member, the open contacts of the travel switches located between the first position switch and the final position switch, the open contacts of the travel switches connected to the control circuit, wherein the circuit included a thyristor and two rechargeable photocouple-circuit loops, the thyristor connected to the open contacts of the travel switches, such that when the retractable member touched the travel switches, the motor of the actuator, the motor of the actuator being stopped, the thyristor provided temporary electric path to let the retractable member to move when the control circuit be powered again, after that when the final position switch touches the retractable member, the motor being stopped, and when a reverse current being applied to the motor through the diode which is paralleled with the final position switch the motor being activated again.

2. The combination as claimed in claim 1, wherein the thyristor is composed of a TRIAC.

* * * * *